United States Patent
Wu (10) Patent No.: US 10,893,465 B2
(45) Date of Patent: Jan. 12, 2021

(54) DEVICE AND METHOD OF RECEIVING SYSTEM INFORMATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 666 days.

(21) Appl. No.: 15/147,921

(22) Filed: May 6, 2016

(65) Prior Publication Data
US 2016/0330677 A1 Nov. 10, 2016

Related U.S. Application Data (60) Provisional application No. 62/158,555, filed on May 8, 2015.

(51) Int. Cl.
| | | |
|---|---|---|
| H04W 48/16 | (2009.01) | |
| H04W 48/10 | (2009.01) | |
| H04W 52/02 | (2009.01) | |
| H04W 48/02 | (2009.01) | |
| H04W 68/00 | (2009.01) | |
| H04W 88/06 | (2009.01) | |

(52) U.S. Cl.
CPC ........... *H04W 48/16* (2013.01); *H04W 48/02* (2013.01); *H04W 48/10* (2013.01); *H04W 52/0216* (2013.01); *H04W 68/005* (2013.01); *H04W 88/06* (2013.01)

(58) Field of Classification Search
CPC ... H04W 48/02; H04W 48/16; H04W 68/005; H04W 48/10; H04W 52/0216; H04W 88/06; H04W 16/24
See application file for complete search history.

(56) References Cited

U.S. PATENT DOCUMENTS

| | | |
|---|---|---|
| 2011/0269466 A1 | 11/2011 | McGilly |
| 2012/0099569 A1 | 4/2012 | Sabol |
| 2015/0173039 A1* | 6/2015 | Rune ................. H04W 52/0216 370/311 |
| 2015/0181575 A1* | 6/2015 | Ng ........................ H04L 5/0092 370/329 |
| 2015/0271736 A1* | 9/2015 | Decarreau ............. H04W 4/005 455/434 |

(Continued)

FOREIGN PATENT DOCUMENTS

WO 2015/066645 A1 5/2015

OTHER PUBLICATIONS

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

(Continued)

*Primary Examiner* — Siming Liu
(74) *Attorney, Agent, or Firm* — Winston Hsu (57) ABSTRACT

A communication device comprises a storage unit for storing instructions and a processing means coupled to the storage unit. The processing means is configured to execute the instructions stored in the storage unit. The instructions comprise receiving a master information block (MIB) indicating that an access for enhanced coverage is supported from a cell; and starting acquiring at least one system information block (SIB) for enhanced coverage.

10 Claims, 6 Drawing Sheets

(56) References Cited

U.S. PATENT DOCUMENTS

| | | | |
|---|---|---|---|
| 2016/0073326 A1* | 3/2016 | Vannithamby | H04W 48/12 370/312 |
| 2016/0338008 A1* | 11/2016 | Xia | H04W 48/10 |
| 2017/0164400 A1* | 6/2017 | Fong | H04W 72/1284 |

OTHER PUBLICATIONS

3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.304 V12.4.0 (Mar. 2015) Technical Specification 3rd Generation Partnership Project; Technical Specification Group Radio Access Network; Evolved Universal Terrestrial Radio Access (E-UTRA); User Equipment (UE) procedures in idle mode (Release 12).

Search Report dated Dec. 9, 2016 for EP application No. 16168677.9, pp. 1~13.

NSN, Nokia, "SIB Coverage Enhancement", 3GPP TSG RAN1#75, R1-135572, Nov. 11-15, 2013, San Francisco, USA, XP050735237, pp. 1-3.

LG Electronics Inc., "Impacts of extended coverage on system information", 3GPP TSG-RAN2 Meeting #85, R2-140780, Feb. 10-Feb. 14, 2014, Prague, Czech Republic, XP050792066, pp. 1-3.

Samsung, "MIB for Rel-13 MTC", 3GPP TSG-RAN WG2#89, R2-150413, Feb. 9-13, 2015, Athens, Greece, XP050935694, pp. 1-3.

Search Report dated Apr. 19, 2018 for EP application No. 18150588.4, pp. 1-10.

Coolpad, "7.8.1", 3GPP TSG RAN WG2 Meeting #85, R2-140207, Feb. 10-14, 2014, Prague, Czech Republic, XP050791610, pp. 1-3.

Office Action dated Mar. 16, 2018 for EP application No. 16168677.9, pp. 1-6.

Sony, "Enhanced Coverage Issues", 3GPP TSG-RAN WG2 Meeting #85, R2-140825, Feb. 10-14, 2014, Prague, Czech Republic, XP050754559, pp. 1-8.

Office action dated Sep. 11, 2019 for IN application No. 201644016071, filing date: May 9, 2016, pp. 1~6.

\* cited by examiner

DEVICE AND METHOD OF RECEIVING SYSTEM INFORMATION

CROSS REFERENCE TO RELATED APPLICATIONS

This application claims the benefit of U.S. Provisional Application No. 62/158,555, filed on May 8, 2015, which is incorporated herein by reference.

BACKGROUND OF THE INVENTION

1. Field of the Invention

The present invention relates to a communication device and a method used in a wireless communication system, and more particularly, to a communication device and method of receiving system information in a wireless communication system.

2. Description of the Prior Art

A long-term evolution (LTE)-advanced (LTE-A) system, as its name implies, is an evolution of the LTE system. The LTE-A system and its evolution include advanced techniques, such as carrier aggregation (CA), licensed-assisted access (LAA) using LTE, dual connectivity, enhanced coverage, etc.

To access a cell, an UE attempts to acquire system information6 broadcasted by a network in a cell. The system information includes a master information block (MIB), a system information block (SIB) Type 1 (SIB1), a SIB Type 2 (SIB2), and new SIB(s). The new SIB(s) are specific for enhanced coverage. However, it is not clear when the UE starts acquiring the new SIB(s) for enhanced coverage. Thus, unnecessary power consumption is caused due to continuous acquiring of the new SIB(s). In addition, the UE starts acquiring the system information upon receiving a paging message indicating system information change. However, the SIB1 and SIB2 cannot be used for enhanced coverage. Thus, unnecessary power consumption is caused by an unnecessary acquiring of the SIB1 and SIB2. In addition, according to the prior art, the UE considers a cell is barred, if the UE does not receive the SIB1 or SIB2 in the cell.

Thus, how to receive system information is an important problem to be solved.

SUMMARY OF THE INVENTION

The present invention therefore provides a method and related communication device for receiving system information to solve the abovementioned problem.

A communication device comprises a storage unit for storing instructions and a processing means coupled to the storage unit. The processing means is configured to execute the instructions stored in the storage unit. The instructions comprise receiving a master information block (MIB) indicating that an access for enhanced coverage is supported from a cell; and starting acquiring at least one system information block (SIB) for enhanced coverage.

A communication device comprises a storage unit for storing instructions and a processing means coupled to the storage unit. The processing means is configured to execute the instructions stored in the storage unit. The instructions comprise receiving a system information block (SIB) Type 1 (SIB1) from a network; verifying whether a SIB Type 2 (SIB2) stored in the communication device is valid by checking a value tag in the SIB1; receiving a SIB for enhanced coverage from the network; and verifying whether at least one SIB for enhanced coverage stored in the communication device is valid by checking a value tag in the SIB for enhanced coverage.

A communication device comprises a storage unit for storing instructions and a processing means coupled to the storage unit. The processing means is configured to execute the instructions stored in the storage unit. The instructions comprise acquiring a system information block (SIB) Type 1 and a SIB Type 2 (SIB2), when the communication device receives a first message indicating a change of system information; and not acquiring at least one SIB for enhanced coverage, when the communication device receives the first message indicating the change of system information.

A communication device comprises a storage unit for storing instructions and a processing means coupled to the storage unit. The processing means is configured to execute the instructions stored in the storage unit. The instructions comprise not considering that a cell is barred, if the communication device receives a master information block (MIB) and at least one system information block (SIB) for enhanced coverage from the cell and does not receive a SIB Type 1 (SIB1) and a SIB Type 2 (SIB2) from the cell; and accessing the cell according to the at least one SIB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
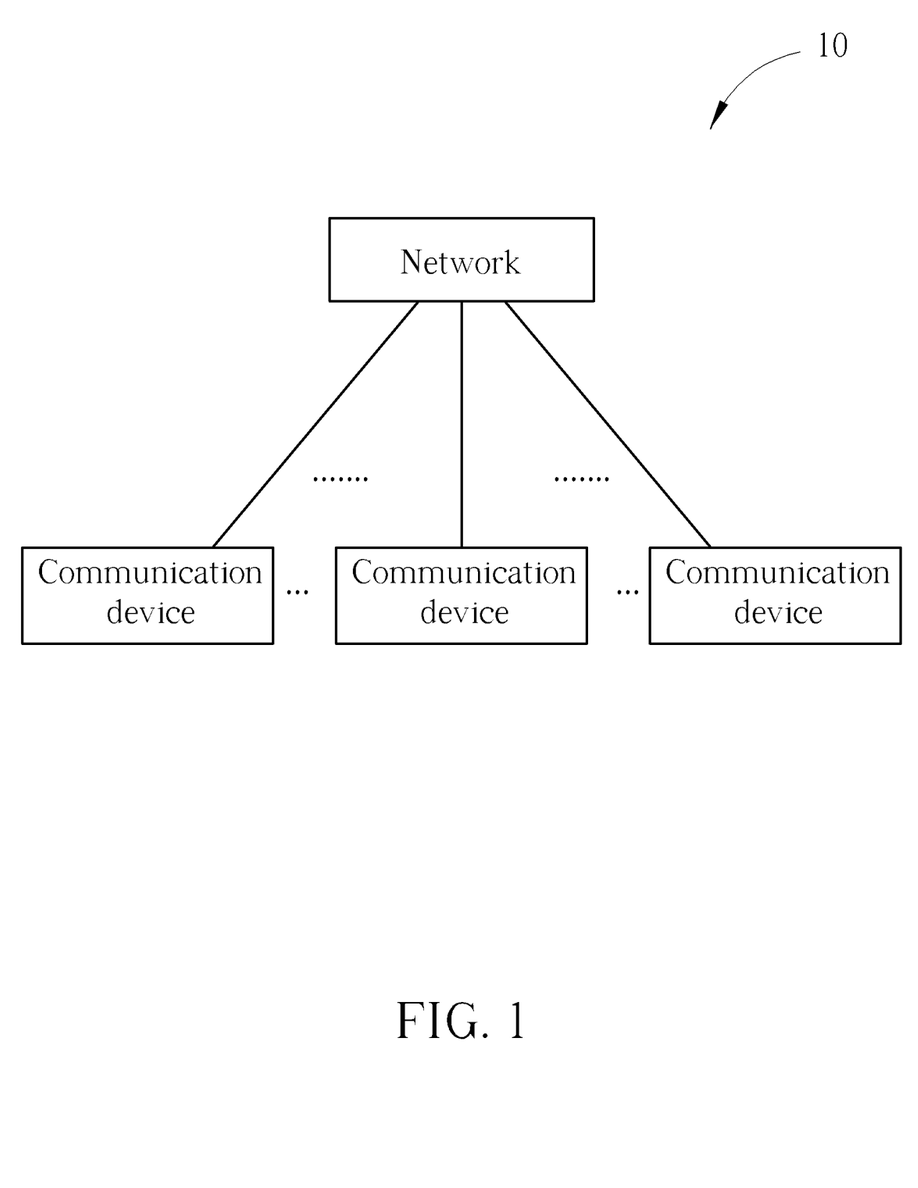
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system, an evolution of the LTE-A system, or a fifth generation (5G) employing orthogonal frequency-division multiplexing (OFDM) and/or non-OFDM for communicating with the communication devices. The eNB or the relay may be termed as a base station.

The communication device 100 may be an user equipment (UE), a mobile phone, a laptop, a tablet computer, an electronic book, a portable computer system, a vehicle or an aircraft. In addition, for an uplink (UL), the communication device 100 is a transmitter and the network is the receiver, and for a downlink (DL), the network is the transmitter and the communication device 100 is a receiver.

Figure 2:
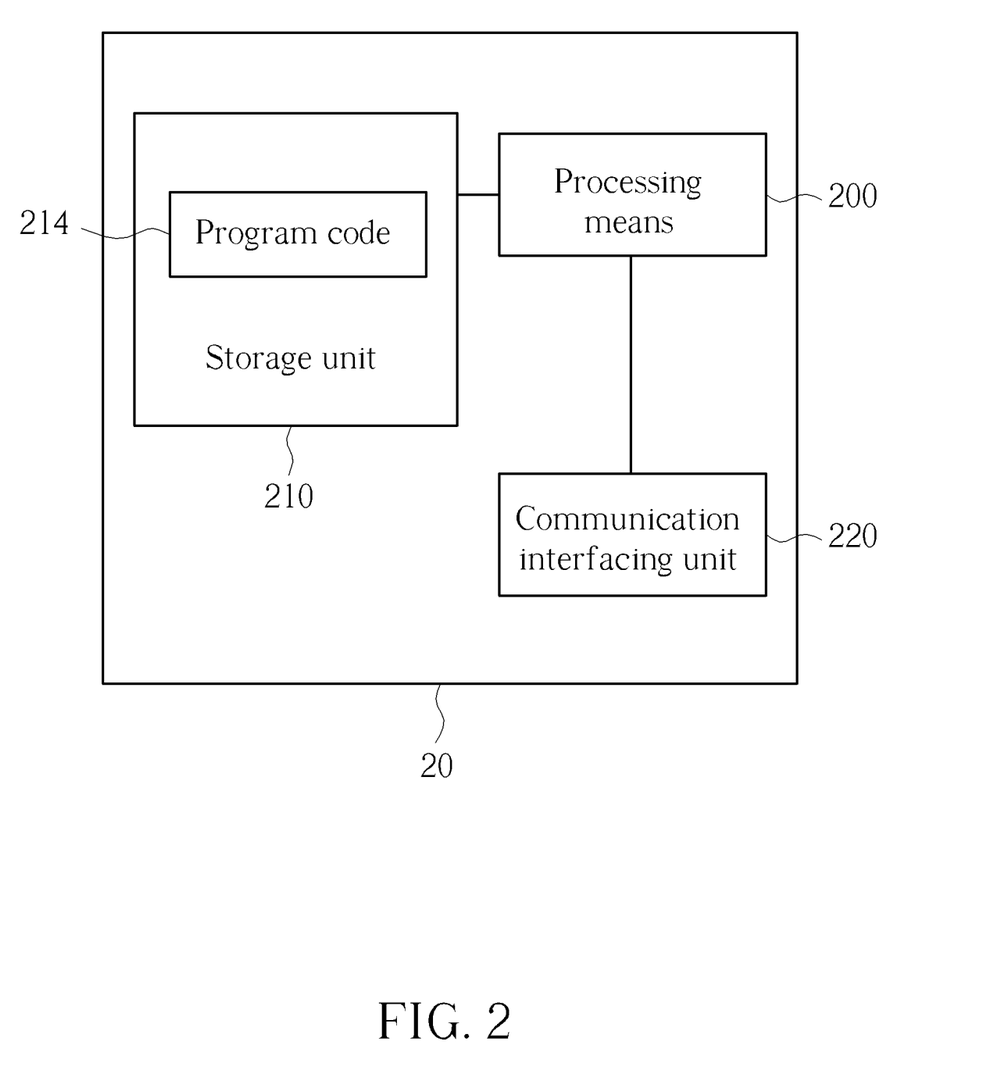
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

In the following embodiments, a UE is used to represent the communication device 100 in FIG. 1 to simplify the illustration of the embodiments.

Figure 3:
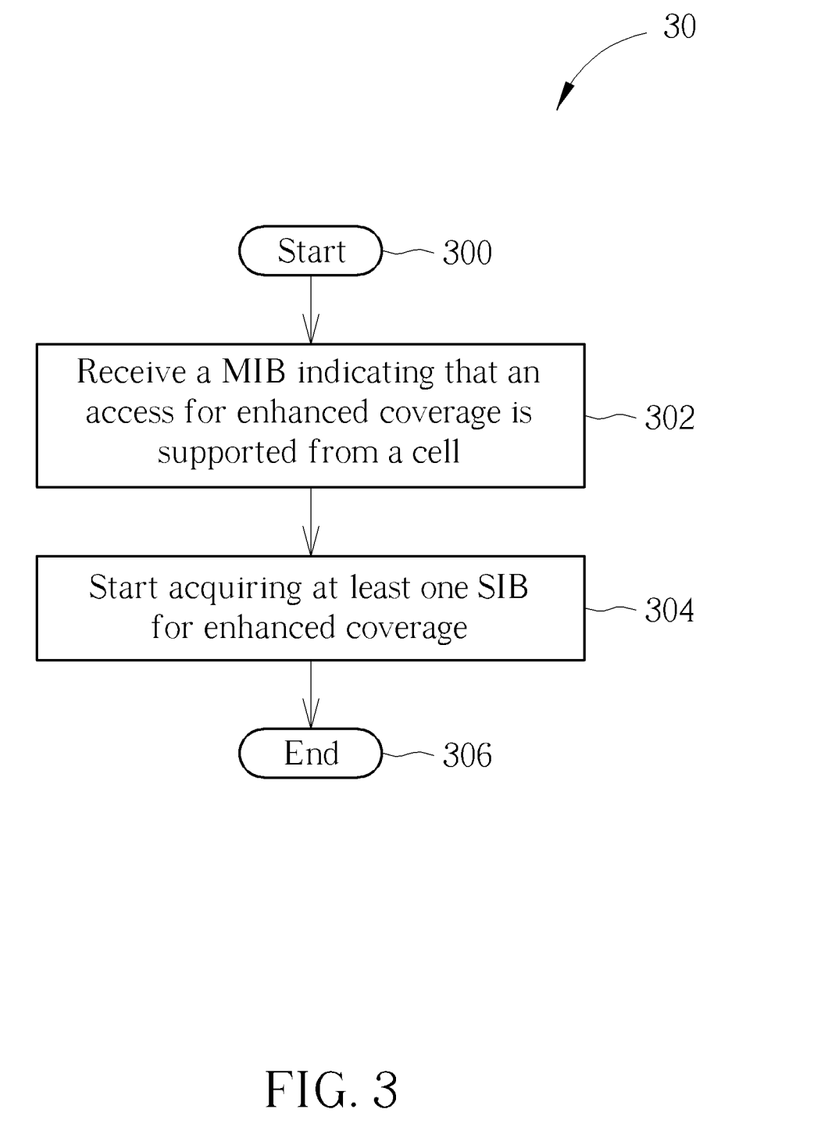
FIG. 3 is a flowchart of a process according to an example of the present invention.

FIG. 3 is a flowchart of a process 30 according to an example of the present invention. The process 30 may be utilized in a UE, to receive system information. The process 30 includes the following steps:

Step 300: Start.
Step 302: Receive a master information block (MIB) indicating that an access for enhanced coverage is supported from a cell.
Step 304: Start acquiring at least one system information block (SIB) for enhanced coverage.
Step 306: End.

According to the process 30, the UE receives a MIB indicating that an access for enhanced coverage is supported from a cell (e.g., of the network). Then, the UE starts acquiring at least one SIB (e.g., new SIB (s)) for enhanced coverage. That is, the UE knows when to start acquiring the at least one SIB for enhanced coverage, i.e., after knowing that the access for enhanced coverage is supported in the cell. Thus, the problem when the UE should start acquiring the at least one SIB for enhanced coverage is solved. As a result, power consumption due to continuous acquiring of the at least one SIB can be avoided.

Realization of the process 30 is not limited to the above description.

In one example, the UE receives a MIB indicating that an access for enhanced coverage is supported from a cell. After receiving the MIB, the UE may start acquiring the at least one SIB for enhanced coverage from the cell, when the UE does not receive a SIB Type 1 (SIB1) and a SIB Type 2 (SIB2). That is, the UE does not attempt to receive the at least one SIB, if the UE is able to receive the SIB1 and SIB2. The UE is able to access the cell according to the MIB, SIB1 and SIB2 by using a legacy way before techniques of enhanced coverage are introduced.

In one example, the UE may receive another MIB indicating that the access for enhanced coverage is not supported from the cell. Then, the UE may stop acquiring (or even not acquire) the at least one SIB for enhanced coverage. That is, the UE stops acquiring (or even not acquire) the at least one SIB for enhanced coverage, after knowing that the access for enhanced coverage is not supported in the cell.

In one example, the at least one SIB may include at least one of a random access configuration and a cell identity of the cell. Thus, the UE may reach the cell according to the random access configuration and the cell identity in the at least one SIB.

Figure 4:
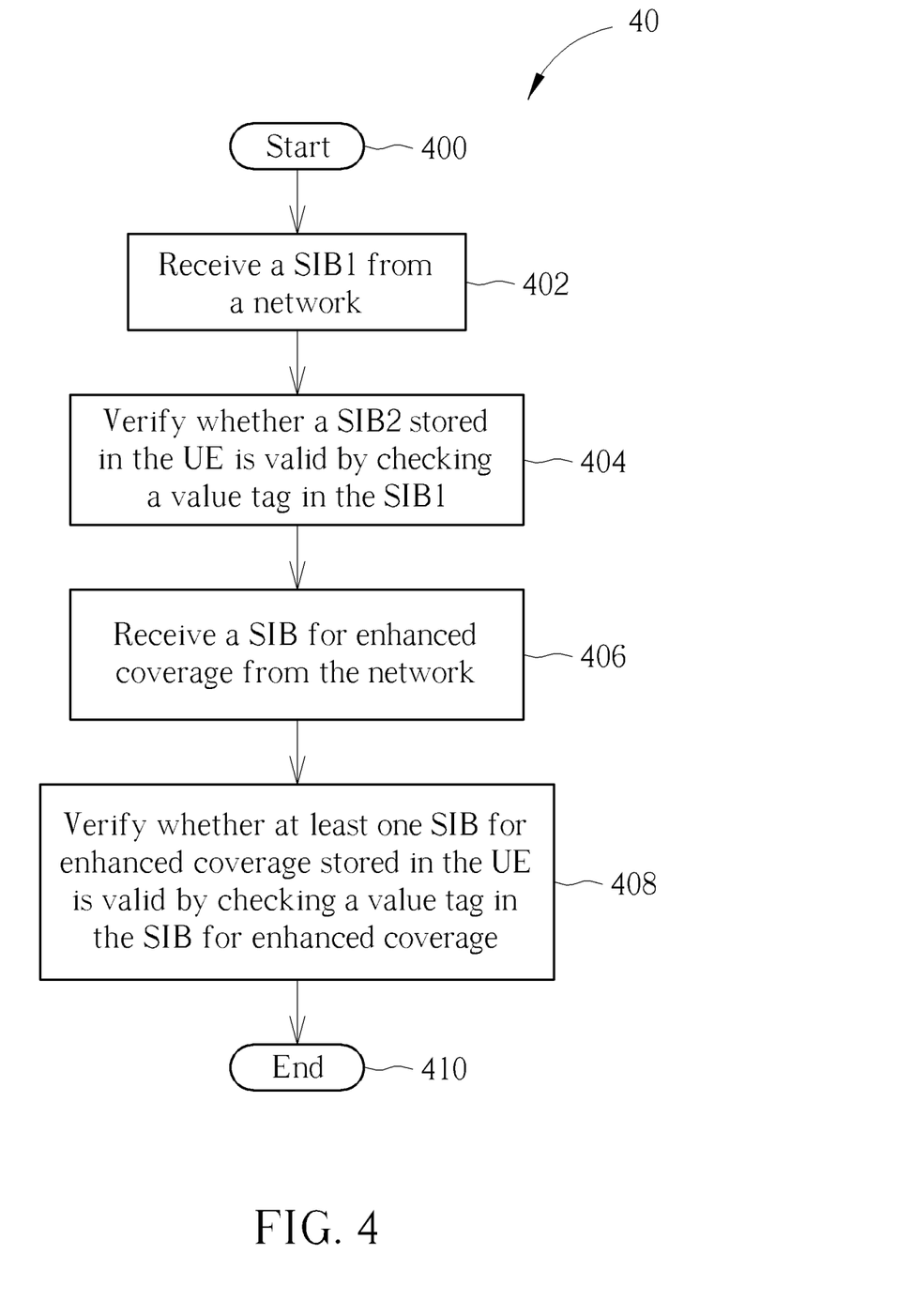
FIG. 4 is a flowchart of a process according to an example of the present invention.

FIG. 4 is a flowchart of a process 40 according to an example of the present invention. The process 40 may be utilized in a UE, to receive system information. The process 40 includes the following steps:

Step 400: Start.
Step 402: Receive a SIB1 from a network.
Step 404: Verify whether a SIB2 stored in the UE is valid by checking a value tag in the SIB1.
Step 406: Receive a SIB for enhanced coverage from the network.
Step 408: Verify whether at least one SIB for enhanced coverage stored in the UE is valid by checking a value tag in the SIB for enhanced coverage.
Step 410: End.

According to the process 40, the UE receives a SIB1 from a network. Then, the UE verifies whether a SIB2 stored in the UE is valid by checking a value tag in the SIB1. The UE receives a SIB for enhanced coverage from the network. Then, the UE verifies whether at least one SIB (e.g., new SIB(s)) for enhanced coverage stored in the UE is valid by checking a value tag in the SIB for enhanced coverage.

In one example, the UE verifies the stored SIB2 is invalid when the value tag in the SIB1 is changed, and verifies the stored SIB2 is valid when the value tag in the SIB1 is not changed. The UE verifies the stored at least one SIB for enhanced coverage is invalid when the value tag in the received SIB for enhanced coverage is changed, and verifies the stored at least one SIB for enhanced coverage is valid when the value tag in the received SIB for enhanced coverage is not changed. In other words, the UE checks whether the value tag in the SIB1 is changed or not to verify whether the stored SIB2 is invalid or not, and checks whether the value tag in the SIB for enhanced coverage is changed or not to verify whether the at least one stored SIB for enhanced coverage is invalid or not.

In one example, the UE receives and stores a SIB2 from a cell of the network. After storing, the UE verifies whether the SIB2 is valid by checking the value tag (e.g., systemInfoValueTag) in the SIB1 after a modification period boundary of a modification period for the SIB1.

In another example, the UE receives and stores at least one SIB for enhanced coverage from the cell or another cell of the network. The UE verifies whether the at least one SIB for enhanced coverage is valid by checking the value tag (e.g. systemInfoValueTag) in the SIB for enhanced coverage after a modification period boundary of a modification period for the at least one SIB for enhanced coverage. The modification period for the at least one SIB for enhanced coverage may be a multiple of the modification period for the SIB1.

Figure 5:
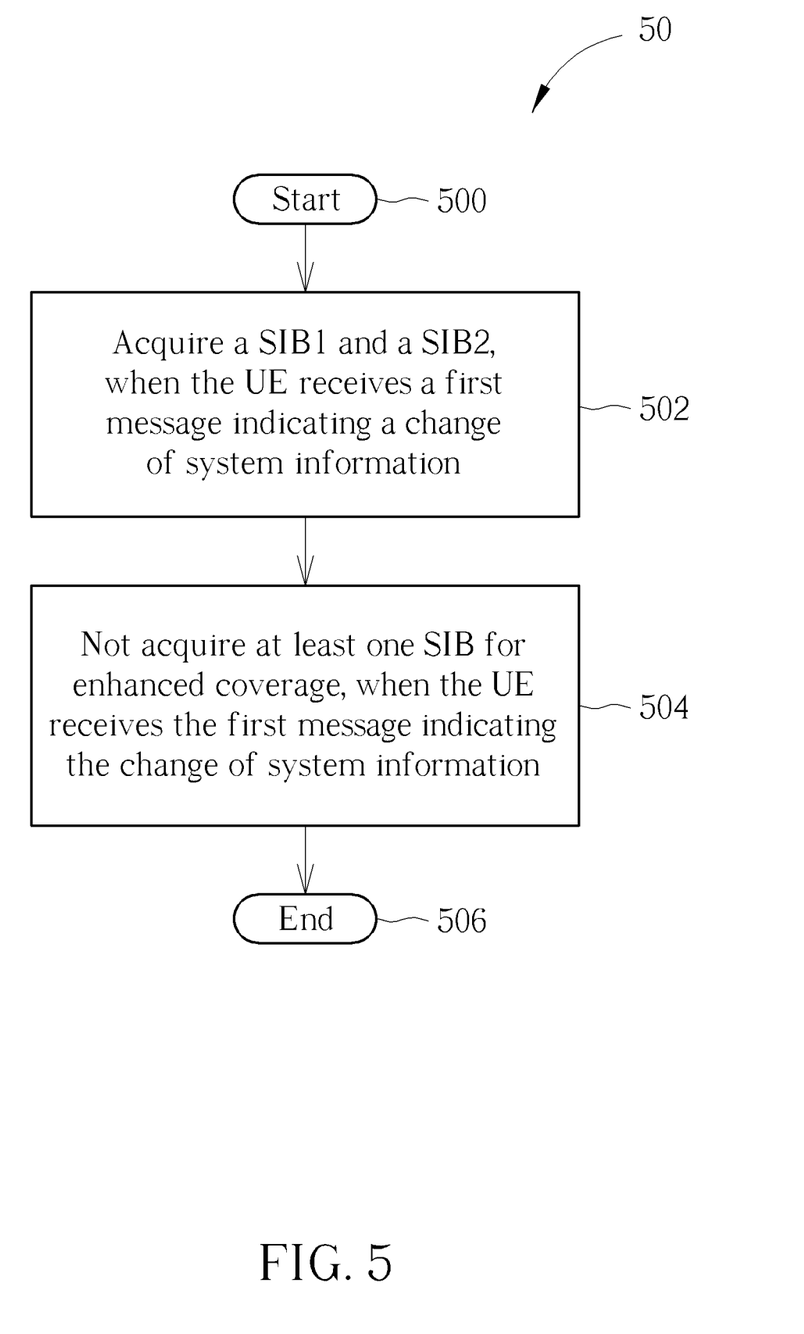
FIG. 5 is a flowchart of a process according to an example of the present invention.

FIG. 5 is a flowchart of a process 50 according to an example of the present invention. The process 50 may be utilized in a UE, to receive system information. The process 50 includes the following steps:

Step 500: Start.
Step 502: Acquire a SIB1 and a SIB2, when the UE receives a first message indicating a change of system information.

Step 504: Not acquire at least one SIB for enhanced coverage, when the UE receives the first message indicating the change of system information.

Step 506: End.

According to the process 50, the UE acquires a SIB1 and a SIB2 and does not acquire at least one SIB (e.g., new SIB(s)) for enhanced coverage, when the UE receives a first message indicating a change of system information. Thus, power consumption caused by unnecessary acquiring of the at least one SIB for enhanced coverage is avoided.

Further, the UE may acquire the at least one SIB for enhanced coverage, when the UE receives a second message indicating a change of the at least one SIB. That is, the UE does not acquire the at least one SIB for enhanced coverage until the second message is received. Thus, the problem that the UE acquires the SIB1 and the SIB2 which cannot be used for enhanced coverage is solved. In other words, a network transmits the first message when the network changes the SIB1 or SIB2 which may be broadcasted by the network in a cell. The network transmits the second message when the network changes the at least one SIB for enhanced coverage.

Furthermore, the UE may verify whether the SIB2 stored in the UE is valid by checking the value tag in the SIB1 as described in the process 40, after receiving the first message. The UE may verify whether the at least one SIB stored in the UE is valid by checking the value tag in the SIB for enhanced coverage as described in the process 40, after receiving the second message.

In one example, the first message is a first paging message and the change of system information is indicated by systemInfoModification in the first paging message. The second message is a second paging message and the change of the at least one SIB is indicated by systemInfoModification in the second paging message.

In one example, the first message may be transmitted in at least one first resource block indicated by a first downlink (DL) control information (DCI) associated with a first radio network temporary identifier (RNTI), and the second message may be transmitted in at least one second resource block indicated by a second DCI associated with a second RNTI.

Figure 6:
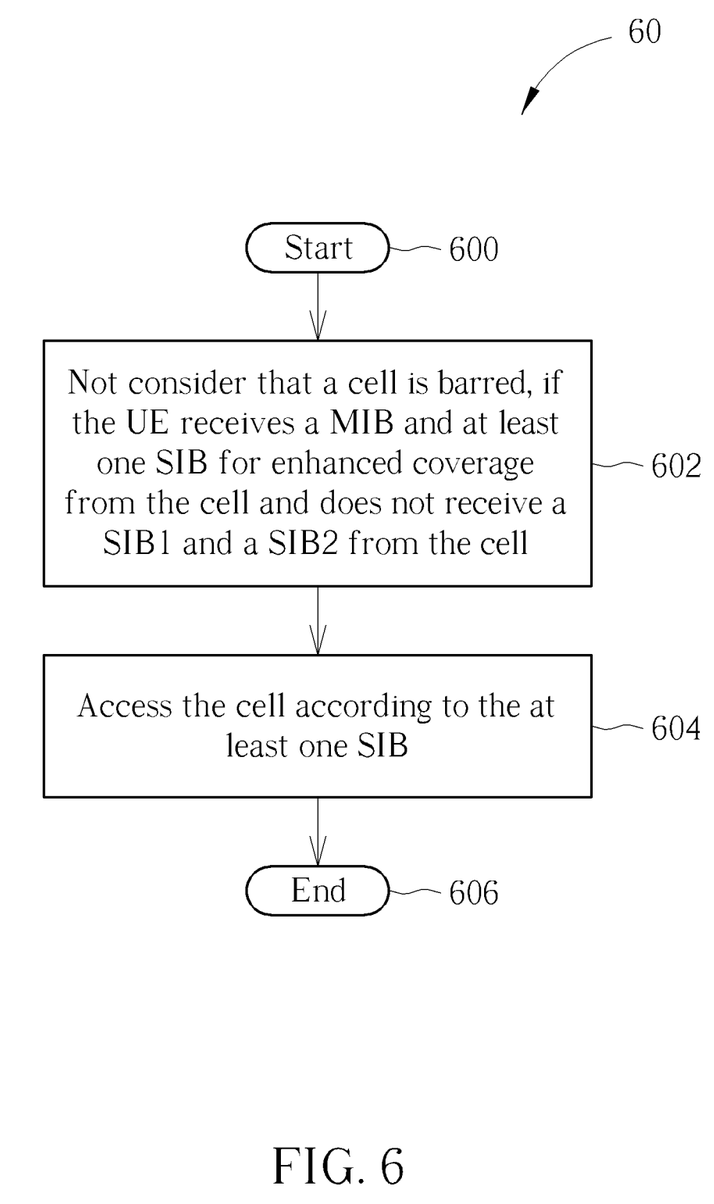
FIG. 6 is a flowchart of a process according to an example of the present invention.

FIG. 6 is a flowchart of a process 60 according to an example of the present invention. The process 60 may be utilized in a UE, to receive system information. The process 60 includes the following steps:

Step 600: Start.

Step 602: Not consider that a cell is barred, if the UE receives a MIB and at least one SIB for enhanced coverage from the cell and does not receive a SIB1 and a SIB2 from the cell.

Step 604: Access the cell according to the at least one SIB.

Step 606: End.

According to the process 60, the UE does not consider that a cell is barred, if the UE receives a MIB and at least one SIB (e.g., new SIB(s)) for enhanced coverage from the cell, and does not receive a SIB1 and a SIB2 from the cell. Then, the UE accesses the cell according to the at least one SIB. That is, the UE may not consider the cell is barred and access the cell, if the SIB1 and SIB2 are not received from the cell. Thus, the problem that the cell is considered barred incorrectly according to the prior art is solved. Further, the UE may consider that the cell is barred, if the UE does not receive the SIB1, the SIB2 and the at least one SIB.

Realization of the process 60 is not limited to the above description.

In one example, the UE may consider that the cell is barred, if the UE receives an access barring configuration in the at least one SIB. That is, the UE considers that the cell is barred according to the access barring configuration.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for receiving system information. Thus, the problem that when the UE should start acquiring the at least one SIB for enhanced coverage is solved. The problem that the UE acquires the SIB1 and the SIB2 which cannot be used for enhanced coverage is solved. The problem that the cell is considered barred incorrectly according to the prior art is solved, either.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
    a storage device; and
    a processing circuit, coupled to the storage device, wherein the storage device stores, and the processing circuit is configured to execute instructions of:
    receiving a system information block (SIB) Type 1 (SIB1) from a network;
    verifying whether a SIB Type 2 (SIB2) stored in the communication device is valid by checking a value tag in the SIB1;
    receiving a SIB for enhanced coverage from the network; and
    verifying whether at least one SIB for enhanced coverage stored in the communication device is valid by checking a value tag in the SIB for enhanced coverage.

2. The communication device of claim 1, wherein the communication device verifies whether the SIB2 is valid by checking whether the value tag in the SIB1 is changed, and the communication device verifies whether the at least one SIB is valid by checking whether the value tag in the SIB is changed.

3. The communication device of claim 1, wherein the communication device verifies whether the SIB2 is valid by checking the value tag in the SIB1, after a modification period boundary of a modification period for the SIB 1.

4. The communication device of claim 1, wherein the communication device verifies whether the at least one SIB is valid by checking the value tag in the SIB, after a modification period boundary of a modification period for the at least one SIB for enhanced coverage.

5. The communication device of claim 4, wherein the modification period boundary for the at least one SIB is a multiple of another modification period for the SIB 1.

6. A communication device, comprising:
a storage device; and
a processing circuit, coupled to the storage device, wherein the storage device stores, and the processing circuit is configured to execute instructions of:
acquiring a system information block (SIB) Type 1 and a SIB Type 2 (SIB2), when the communication device receives a first message indicating a change of system information; and
not acquiring at least one SIB for enhanced coverage, when the communication device receives the first message indicating the change of system information.

7. The communication device of claim 6, wherein the instruction of receiving the first message indicating the change of system information comprises:
verifying whether the SIB2 is valid by checking a value tag in the SIB1, after receiving the first message.

8. The communication device of claim 6, wherein the instructions further comprise:
acquiring the at least one SIB for enhanced coverage, when the communication device receives a second message indicating a change of the at least one SIB.

9. The communication device of claim 8, wherein the first message is a first paging message and the second message is a second paging message.

10. A communication device, comprising:
a storage device; and
a processing circuit, coupled to the storage device, wherein the storage device stores, and the processing circuit is configured to execute instructions of:
not considering that a cell is barred, if the communication device receives a master information block (MIB) and at least one system information block (SIB) for enhanced coverage from the cell and does not receive a SIB Type 1 (SIB1) and a SIB Type 2 (SIB2) from the cell;
accessing the cell according to the at least one SIB; and
considering that the cell is barred, if the communication device receives an access barring configuration in the at least one SIB.

* * * * *